United States Patent
Mutchler et al.

(10) Patent No.: US 6,921,804 B2
(45) Date of Patent: Jul. 26, 2005

(54) CASCADED POLYOLEFIN SLURRY POLYMERIZATION EMPLOYING DISENGAGEMENT VESSEL BETWEEN REACTORS

(75) Inventors: Joel A. Mutchler, Morris, IL (US); Kiran M. Gupte, Naperville, IL (US); Michael H. Treptau, Channahon, IL (US)

(73) Assignee: Equistar Chemicals L.P., Houston, TX (US)

( * ) Notice: Subject to any disclaimer, the term of this patent is extended or adjusted under 35 U.S.C. 154(b) by 133 days.

(21) Appl. No.: 10/396,900

(22) Filed: Mar. 25, 2003

(65) Prior Publication Data

US 2004/0192861 A1 Sep. 30, 2004

(51) Int. Cl.[7] .................................................. C08F 6/24
(52) U.S. Cl. ...................... 528/502 R; 526/64; 526/65; 422/132; 422/134
(58) Field of Search ................. 528/502 R; 526/64, 526/65; 422/132, 134

(56) References Cited

U.S. PATENT DOCUMENTS

| | | | |
|---|---|---|---|
| 5,032,562 A | * | 7/1991 | Lo et al. ..................... 502/111 |
| 5,525,678 A | * | 6/1996 | Mink et al. ................... 525/246 |
| 5,597,892 A | * | 1/1997 | Hanson ....................... 528/501 |
| 5,639,834 A | | 6/1997 | Debras et al. |
| 6,221,982 B1 | | 4/2001 | Debras et al. |
| 6,225,421 B1 | | 5/2001 | Promel et al. |
| 6,291,601 B1 | | 9/2001 | Debras |
| 6,346,575 B1 | | 2/2002 | Debras et al. |
| 2003/0161765 A1 | * | 8/2003 | Kendrick et al. ........... 422/132 |

FOREIGN PATENT DOCUMENTS

| | | |
|---|---|---|
| EP | 0 507 420 | 8/1982 |
| WO | WO 95/10548 | 4/1995 |
| WO | WO 95/11930 | 5/1995 |
| WO | WO 98/58001 | 12/1998 |

* cited by examiner

Primary Examiner—Fred Teskin
(74) Attorney, Agent, or Firm—Brooks Kushman P.C.

(57) ABSTRACT

A disengagement vessel employing a lock hopper effectively reduces concentration of non-polymer-associated components in the polymer product slurry of a first olefin slurry polymerization reactor, allowing cascading of a second slurry polymerization reactor operating at lesser concentration of comonomers, hydrogen, and other components to produce multicompositional polyolefin polymers and/or polymers having a multimodal monomer distribution, e.g. diblock polymers having substantially non-overlapping comonomer contents between the blocks.

18 Claims, 2 Drawing Sheets

CASCADED POLYOLEFIN SLURRY POLYMERIZATION EMPLOYING DISENGAGEMENT VESSEL BETWEEN REACTORS

BACKGROUND OF THE INVENTION

1. Field of the Invention

The present invention pertains to the use of cascaded slurry reactors to polymerize olefins to produce polyolefin homo- and copolymers of multimodal molecular weight distribution and/or composition.

2. Background Art

Slurry reactors are in widespread use for production of polyethylene homo- and copolymers. Slurry reactors include stirred tank reactors and water-jacketed tubular reactors arranged in a series of continuous horizontal or vertical loops. A "slurry solvent" in which polyethylene has low solubility constitutes the continuous phase in such reactors, and in the case of slurry loop reactors, is driven around the loop at relatively high speed by one or more rather massive pumps. Ethylene, supported catalyst, comonomers, and processing additives are injected into the loop where polymerization takes place, creating a slurry of polyethylene in solvent. A plurality of settling legs allow polymer particles to partially sediment out, creating a slurry of higher solids content, which is released periodically to harvest polymer. Slurry processes are widely used throughout the world. It has recently been proposed to cascade slurry reactors to produce multimodal resins.

Multimodal (including bidmodal) polyolefin resins are desirable due to the improved processability associated with a lower molecular weight fraction, and superior physical properties associated with a higher molecular weight component. See, e.g., U.S. Pat. No. 6,346,575 in this respect. Polyolefin resins which contain blocks of different composition, whether due to differences in properties such as long chain branching, or due to differing monomer content, are also desirable in many applications. Such polymers may be described as having a multicompositional (including bimodal, or "diblock") monomer distribution.

Multimodal resins may be prepared by physical blending two or more resins having different molecular weight distributions. One disadvantage of such blended resins is that blending constitutes an additional process step. Moreover, the blending must be performed in such a way that a homogenous product is obtained. The blending operation not only adds additional cost to the resin, but moreover, resins produced by blending have generally inferior physicochemical properties as compared to multimodal resins having been produced by "in situ" routes.

Preparation of polymer blends in situ avoids physical blending and its disadvantages. Four types of in situ multimodal polymer production may be conceptualized. In a first process, a single reactor is employed with two distinctly different catalysts, each catalyst prepared separately on its respective support. One catalyst is selected to provide a higher molecular weight product than the other catalyst. In such a process, two distinctly different polymers are created, and the product is distinctly heterogeneous. Such products are generally inferior in their processing properties, especially for applications such as film production.

In a second process, a single reactor is again used, but two different catalysts are contained on the same support, i.e., so-called "dual site" catalysts. As a result, two different polymers grow from the same catalyst particle. The resultant polymer may be described as "interstitially mixed." A much greater degree of homogeneity in the polymer product is thus obtained at the expense of more complex catalyst preparation. Although this process offers advantages in capital and installed costs relative to multi-reactor processes, the design and synthesis of dual site catalysts is difficult. An additional process disadvantage is that use of a single reactor reduces the number of process parameters that can be manipulated to control polymer properties.

In a third process, cascaded reactors are employed, and additional catalyst is added to the second reactor. The polymer particles from the first reactor continue growth in the second reactor, although at a slower rate. However, new polymer growth begins on the newly added catalyst. Hence, as with the first process described, a heterogenous polymer product is obtained, with the same deficiencies as described previously for such products.

In a fourth process, cascaded reactors are again employed, but catalyst is added only to the first reactor. The supported catalyst associated with the first reactor polymer contain further active sites which initiate polymerization in the second reactor. The second reactor polymerization parameters are adjusted to establish a different polymerization rate and/or molecular weight range as compared to the first reactor. As a result, an interstitially mixed polymer is obtained.

EP-A-0057420 represents an example of a cascaded slurry process wherein catalyst is introduced only into the first reactor. However, molecular weight is regulated by the presence of hydrogen in both reactors, with the second reactor having higher hydrogen concentration than the first reactor, thus limiting the types of interstitially mixed polymers which may be produced. Polymerization at lower hydrogen pressure in the second reactor is not possible. In addition, the polymer formed in each reactor is limited to a specific weight percentage range relative to the weight of the final product.

U.S. Pat. No. 5,639,834 (WO 95/11930) and published application WO 95/10548 disclose use of cascaded slurry reactors in which the catalyst feed is also limited to the first reactor. In both references, the first reactor polymerization is conducted at very low hydrogen concentration, and all olefin comonomer is incorporated within the first reactor. The second polymerization is conducted at high hydrogen concentration with no comonomer feed. U.S. Pat. No. 5,639,834 additionally requires that the takeoff from the first reactor be by way of a settling leg. Continuous takeoff is said to produce inferior products. These processes do not allow operation of the second reactor at lower hydrogen concentration than the first reactor. Moreover, limiting olefin comonomer incorporation to only the first reactor limits the types of polymers which may be produced.

WO 98/58001 alleges that significant advantages in polymer properties are achievable by conducting a two-stage polymerization, the first stage at high hydrogen concentration and low comonomer concentration, and the second stage at low hydrogen concentration and high comonomer incorporation. The reactor may be a single reactor or a cascaded reactor system, the latter being preferred. A single catalyst, introduced into the first reactor, may be used. Lower hydrogen concentration in the second stage is achieved by limiting the choice of catalysts to those which rapidly consume hydrogen. Cessation of hydrogen feed thus causes the hydrogen concentration to fall rapidly between stages. The inability to add significant comonomer to the second stage or to increase comonomer incorporation in the first stage detracts from the ability to produce a wide variety of polymers. Moreover, the catalyst choice is limited to those which consume hydrogen, when a single catalyst is used.

U.S. Pat. Nos. 6,221,982 B1 and 6,291,601 B1 disclose cascaded slurry polymerizations where at least two distinct catalysts are employed. In U.S. Pat. No. 6,221,982, a Ziegler-Natta catalyst is employed in the first reactor with high hydrogen concentration and no or low comonomer incorporation. A hydrogen-consuming catalyst with low olefin polymerization efficiency is introduced downstream into the first reactor product stream. As a result, hydrogen is consumed prior to reaching the second reactor, wherein the polymerization is conducted at substantially zero hydrogen concentration. The second stage employs significant olefin comonomer. U.S. Pat. No. 6,291,601 is similar, but employs a metallocene catalyst in the first reactor.

Both the U.S. Pat. Nos. 6,221,982 and 6,291,601 processes, as well that of WO 98/58001, are inefficient in both monomer usage and thermal loading, since the hydrogenation reaction consumes ethylene, producing ethane by hydrogenation. In addition to the increased thermal loading created by this reaction, the ethane produced is an inert gas which must be purged from the system. Moreover, in the U.S. Pat. Nos. 6,221,982 and 6,291,601 processes, an additional relatively expensive hydrogenation catalyst which contributes little to polymer production must be added. Finally, all three processes require substantially homopolymerization in at least the first reactor, thus limiting the types of polymers which may be produced.

U.S. Pat. No. 6,225,421 B1 discloses use of cascaded reactors wherein ethylene is homopolymerized in the presence of hydrogen in a first reactor, hydrogen is physically separated from the first reactor product stream, and the product is copolymerized with 1-hexene and additional ethylene at reduced hydrogen concentration in the second reactor. However, the patent contains no disclosure of any apparatus suitable for removing hydrogen from the first reactor product stream. Moreover, the necessity to restrict the first polymerization to homopolymerization is limiting.

It is also desirable to produce polymers having a block configuration. One block may be different from another due to greater or lesser long chain branching, for example, or the blocks may be different due to different comonomer incorporation. In cascaded reactors, it is difficult to obtain a sharp delineation between blocks due to transfer of monomers, catalyst, etc. from the first reactor into the second. For example, if a diblock copolymer having a first block derived from copolymerizing ethylene and 1-butene and a second block derived from copolymerizing ethylene and 1-hexene, butene in the exit stream of the first reactor will cause the second block to contain butene as well as hexene.

It would be desirable to use series-configured slurry reactors wherein hydrogen is introduced into a first slurry reactor to produce a low molecular weight first polymer, following which this first polymer then introduced into a second reactor operated at lower hydrogen concentration, without the requirement of employing a catalyst which specifically encourages hydrogenation. It would further be desirable to provide a cost-effective apparatus suitable for removing hydrogen from the product stream of a first reactor operating at higher hydrogen concentration than a second reactor in series with the first. It would be yet further desirable to provide a hydrogen removal process which can accommodate comonomer incorporation in any reactor of the reactor battery. It would also be desirable to provide a process where any soluble or gaseous component can be effectively removed or reduced to low concentration prior to the entry of the first reactor product stream into a subsequent reactor, especially comonomers, such that multiblock polymers may be produced where the comonomer content of a second or subsequent block may be selected independently of the comonomer employed in the first or prior reactor.

SUMMARY OF THE INVENTION

It has now been surprisingly discovered that hydrogen and other components which are not associated with polyolefin particles may be effectively removed from the product stream of a first polyolefin slurry polymerization reactor through means of a disengagement vessel equipped with a lock hopper for harvesting a polyolefin polymer slurry having significantly reduced concentration of "non-polymer-associated components." The process preferably removes hydrogen from the first slurry reactor. The lock hopper contents are flushed intermittently into a subsequent polymerization reactor.

DETAILED DESCRIPTION OF THE PREFERRED EMBODIMENTS

Thus, the present invention pertains to a polyolefin polymerization process wherein at least two slurry reactors are employed to produce multimodal and/or multicompositional polyolefin resins, preferably a process wherein a first reactor employs hydrogen to limit polymer molecular weight, and a second reactor employs a reduced level of hydrogen or no hydrogen to produce a higher molecular weight polymer. By hydrogen is meant diatomic hydrogen. In the case where three or more series connected reactors are employed, the hydrogen concentration in a "prior" reactor will be higher than that in a "subsequent" reactor. The process may also be used to eliminate or substantially reduce soluble or gaseous components other than hydrogen from a prior reactor, i.e. other non-polymer-associated components. Thus, the two reactors, even though cascaded in series, can operate substantially independently.

The process is highly flexible, and allows free choice of comonomer incorporation in each reactor. Moreover, while not necessarily desirable, the process allows for use of multiple catalysts among the various reactors. Catalyst choice is virtually unlimited. In addition, other reactors may be operated in parallel, for example but not by limitation as parallel feeds to a single subsequent reactor.

Slurry processes for olefin polymerization are well known, and are described, for example, in PROCESS ECONOMICS PROGRAM REPORTS 185 and 185A (2000). Additional details may be found in the patents cited previously, herein incorporated by reference, and in many other patents, publications and treatises. These and other references also disclose numerous catalysts, modifiers, etc., which can be used in slurry polymerization processes.

In a preferred embodiment of the present invention, the hydrogen content of a first reactor product stream is lowered to a lower concentration by means of a disengagement vessel ("DV") for hydrogen ("HDV"), generally of elongate construction, equipped with a lock hopper for product transfer at a lower end thereof. The remaining details of the slurry polymerization process are conventional and well known to those skilled in the art.

Figure 1:
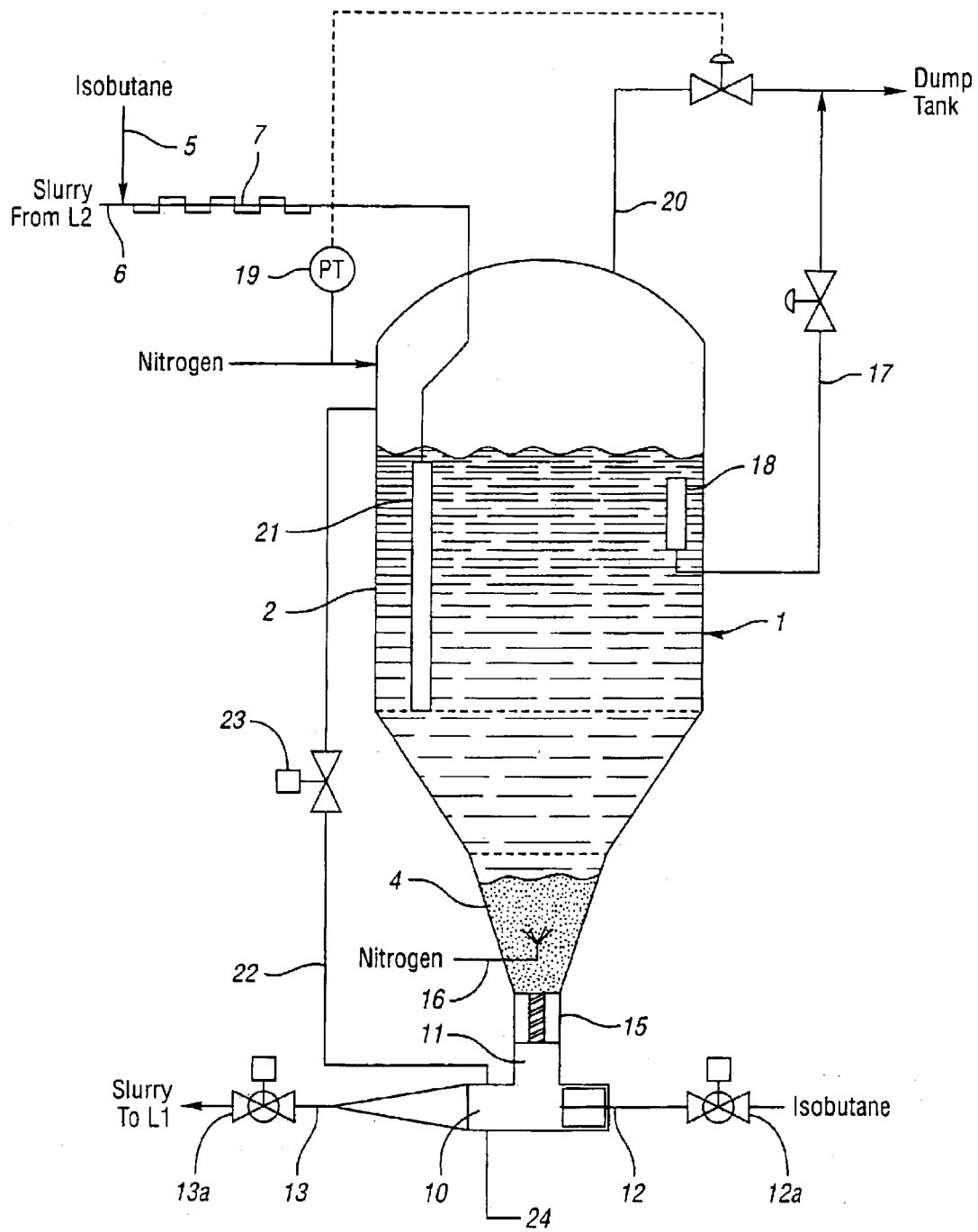
FIG. 1 illustrates one embodiment of a disengagement vessel in accordance with the subject invention.

The DV of the present invention may be best described with reference to one embodiment thereof as illustrated in FIG. 1. The DV body 1 in this embodiment is an elongate tank 2 terminating at a bottom portion into a conical end 4. Entering the body 1 from the top (side entry is of course also possible) is prior reactor product stream 6, optionally heated by heater 7. At the bottom of the DV is lock hopper 10, having polymer inlet 11, solvent flush inlet 12, and polymer slurry outlet 13. In this embodiment, a shot feeder 15 is located between the DV conical end 4 and the interior cavity of lock hopper 10. An optional nitrogen sparge inlet 16 is located near the bottom of the DV. The DV is equipped with a level control line 17 associated with a level detector 18 which maintains a constant fluid level. The DV is also equipped with a pressure sensor 19 and a vapor discharge line 20. An optional fresh solvent line 5 adds fresh solvent to the incoming prior reactor product stream. Valves 12a and 13a control the flushing of the lock hopper. Operation of pressure and level controls is well known to those skilled in the art.

In operation, the DV is preferably operated at the bubble point of the solvent, at an elevated temperature with respect to the prior reactor. For example, when the solvent is isobutane and the prior reactor operates at 700 psig (ca. 49 bar) and 180° F. (82° C.), the DV may advantageously operate at 500 psig (ca. 35 bar) and 210° F. (99° C.). The prior reactor product stream may be heated, for example by steam, to the higher temperature desired, the DV may be surrounded with a heat jacket, or any combination of these or other means of heating may be employed to establish the desired operating temperature.

The prior reactor product stream preferably enters the DV through an inlet 21, positioned below the surface of liquid in the DV to minimize turbulence. Polymer particles begin to settle toward the bottom of the conical end 4 of the DV. The lock hopper has been filled with solvent, preferably at a somewhat lower temperature than the DV slurry. The pressure of solvent in the lock hopper should be substantially the same as that in the vessel above. If the pressure cannot be adjusted easily to be substantially the same by other means, a pressure equalization line 22 may communicate with the vessel to ensure equal pressure. This line may be valved by control valve 23 during emptying of the lock hopper. The shot feeder may also incorporate a dump line 24 to empty the lock hopper of solvent during shut down, maintenance, etc. The shot feeder is rotated to an open position, connecting the DV interior with the lock hopper interior. The heavier polymer particles flow down into the lock hopper, displacing the preferably cooler and hence denser solvent in the lock hopper, which then flows upward countercurrent to the settling polymer particles, washing them of first reactor solvent. The more dense solvent in the lock hopper has little tendency to mix intensely with the less dense, higher temperature solvent, this disinclination toward mixing at the bottom of the conical end of the DV being assisted by introduction of a nitrogen sparge which is preferably introduced at or above the area where the lock hopper solvent and DV slurry solvent meet.

Thus, when hydrogen disengagement is desired, for example, the lock hopper, initially full of solvent having zero hydrogen concentration, gradually receives polymer particles which have been washed by displacement of upward flowing solvent. When the lock hopper contains the desired solids level, the shot valve is closed, and the lock hopper inlet 12a and outlet 13a valves are opened. Solvent flushes the polymer slurry from the lock box, and fills the lock box with fresh, hydrogen-free solvent. The cycle is then repeated. The polymer slurry from the lock hopper, now substantially depleted of hydrogen, is introduced directly or indirectly into a subsequent slurry reactor. This same process may be used effectively to disengage other prior reactor components, such as olefin comonomers.

The second or subsequent reactor also, in general, has a finite hydrogen concentration. In many cases, therefore, the polymer slurry contents of the lock hopper may be directly input into the subsequent reactor. If necessary, the pressure of the polymer slurry may be increased by conventional methods prior to its entry into the subsequent reactor. In general, the hydrogen in the polymer slurry feed to the subsequent reactor will constitute less than 10% of the total hydrogen feed to the subsequent reactor, and is preferably less than 5%, more preferably less than 2% of the fresh hydrogen feed, on a mol/mol basis.

Should no hydrogen or only a very low hydrogen feed be fed to the subsequent reactor, the low level of hydrogen in the polymer slurry of the lock hopper may still be too high for effective control of polymer parameters, particularly melt index, in the subsequent reactor. In such a case, the lock hopper slurry outlet stream may enter a second HDV operating in the same manner, to further lower hydrogen concentration prior to entry into the subsequent reactor. Alternatively, the polymer slurry from the lock hopper may enter a flash drum or series of flash drums where solvent is flashed away at reduced pressure, hydrogen being also removed in the solvent flashoff. The polymer slurry discharge from the flash drum may then comprise an inlet stream to the subsequent reactor. By "direct" introduction into a subsequent reactor is meant that the polymer slurry is not further treated to remove hydrogen following its exit from the HDV.

Vapor and/or liquid exiting the DV in response to level and/or pressure control is treated in the conventional manner as with other streams of the overall polymerization process to remove and recycle solvent, unreacted monomer, etc. For those streams where separation is impractical, the various streams may be burned for their fuel value.

Figure 2:
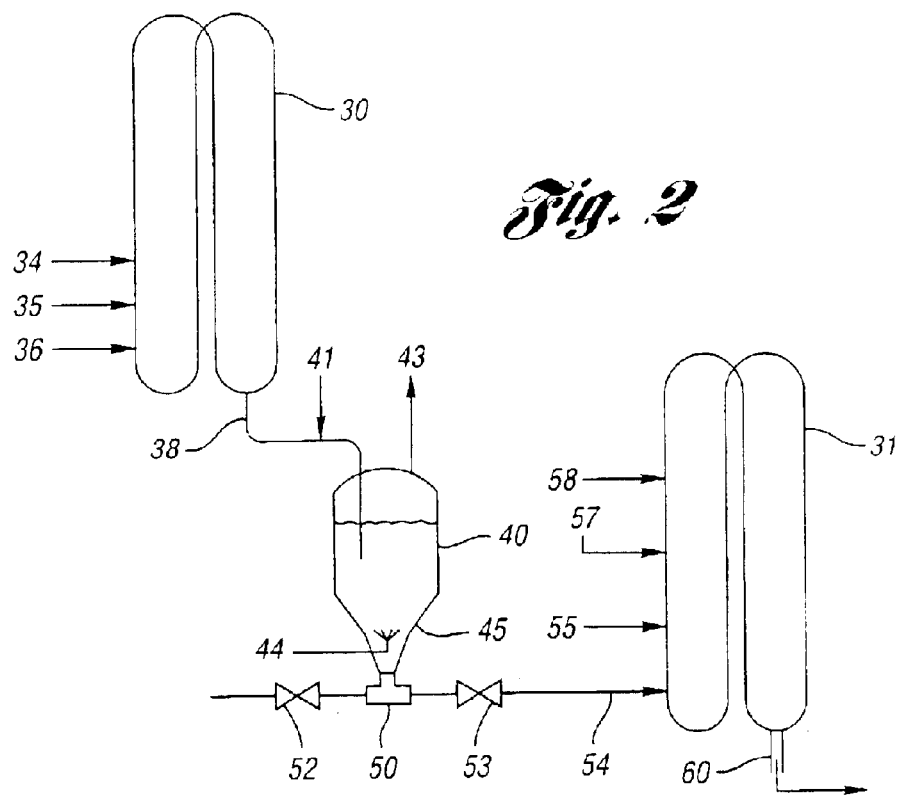
FIG. 2 illustrates schematically one embodiment of cascaded slurry reactors employing an intermediate disengagement vessel to lower hydrogen concentration in the product slurry from a first slurry reactor prior to its introduction into a second slurry reactor.

FIG. 2 illustrates a simplified diagram of a cascaded polyolefin slurry polymerization process employing a disengagement vessel of the subject invention. FIG. 2 illustrates two continuous loop slurry reactors 30 and 31. The first slurry loop reaction is shown with three feed lines 34, 35 and 36, although a greater or lesser number may also be used. These feed lines feed solvent, monomer, comonomer (when used), hydrogen, catalyst, catalyst activators and water scavengers, antistats, etc., either with dedicated inlets for each, or combination inlets. From one loop of slurry loop reactor legs, a product takeoff leg 38, which may be of the continuous type, or a single or one of a plurality of conventional settling legs, provides a polymer slurry from reactor 30 to the hydrogen disengagement vessel 40 as previously described. Fresh solvent is optionally added to the product takeoff leg at 41, while gases exit the DV at 43. Hydrogen disengagement is augmented by a nitrogen inlet (sparge) 44, and settling polymer particles collect in the lower portion 45 of DV 40, and flow intermittently into solvent-filled lock hopper 50. The polymer is flushed intermittently from the lock hopper by opening and then closing flush valves 52 and 53, valve 52 flushing the polymer from the lock hopper through valve 53 by means of fresh solvent 51. The outlet slurry flowing through line 54 serves as an inlet stream to subsequent reactor 31, along with additional inlet streams 55, 57 and 58, which, for example, may feed additional olefin monomer, comonomer, and solvent, and optionally but not preferredly, additional catalyst, activator, scavengers, and the like. Product takeoff from reactor 31 is preferably by means of one or more conventional settling legs 60. The product slurry is treated conventionally to remove solvent and unreacted monomers, i.e., by a series of product separation flash drums.

Figure 3:
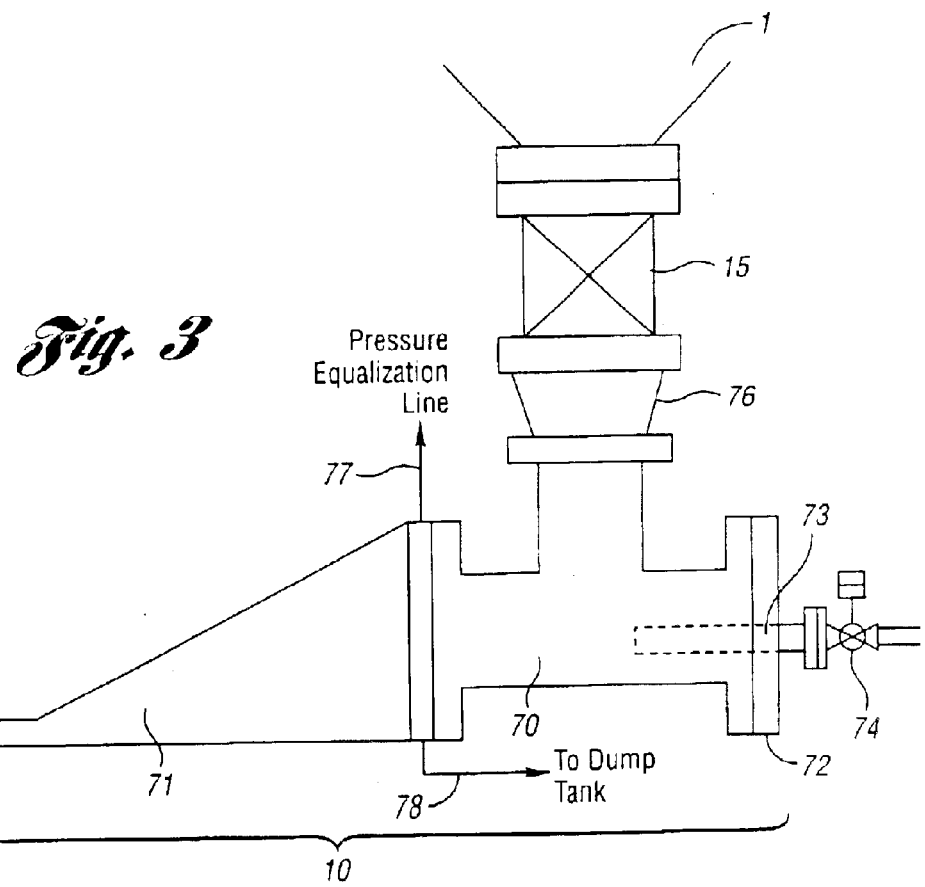
FIG. 3 illustrates one embodiment of a lock hopper useable with a disengagement vessel.

FIG. 3 illustrates in detail a stainless steel lock hopper which has been used with a 30 inch (76 cm) diameter disengagement vessel, located below shot feeder 15 and disengagement vessel 1. The lock hopper 10 is connected to the shot feeder by a 3 inch by 2 inch (7.5 cm×50 cm) reducer 76. The lock hopper 10 consists of a 2 inch (5.0 cm) pipe tee 70, connected to a 2 inch by ¾ inch (5.0 cm×1.9 cm) eccentric reducer 71 by standard connecting flanges. At the right of tee 70 is a flanged closure 72 through which a ½ inch (1.27 cm) solvent flush pipe 73 passes, terminating at about the near T-juncture of the tee 70. Entry of flush solvent into the solvent flush pipe 73 is controlled by ½ inch (1.27 cm) ball valve 74. Discharge of polymer slurry from the lock hopper 10 is through discharge ball valve (¾ inch; 1.9 cm) 75. The choice of components was made to take advantage of standard components. In a commercial embodiment, corresponding components would likely be fabricated. Also shown schematically is optional pressure equalization line 77 and dump line 78.

The solvent used in the process of the invention may be any solvent or solvent mixture conventionally used, for example hexane or heptane, but is preferably a light solvent such as propane, butane, or isobutane. Isobutane is preferred. By the term "light solvent" is meant a paraffinic solvent having a boiling point less than 0° C. under standard pressure.

The predominant olefins to be polymerized ("monomers") include ethylene, propylene, 1-butene, 2-butene, etc. Ethylene and propylene are most preferred. Suitable comonomers are unsaturated compounds, preferably olefins, other than the predominant olefin monomer. Thus, when ethylene is the monomer, propylene may be a comonomer, and vice versa. Preferred comonomers for polyethylene copolymers, in addition to propylene, include 1-butene, 1-hexene, 1-octene, 1-decene, 1-dodecene, norbornene, cyclohexene, and dienes such as 1,3-butadiene. For polypropylene copolymers, preferred comonomers include ethylene and those of $C_4$ or greater carbon content listed as comonomers for polyethylene polymers. The comonomers listed above are exemplary, and not limiting, and may be used in mixtures as well. Other unsaturated monomers such as styrene, (meth)acrylates, (meth)acrylic acid, vinyl halides, vinyl ethers, vinyl esters, maleic and fumaric acids and the like may be used in minor amounts along with the olefin monomers and comonomers. Preferably, only olefin monomers and comonomers are used.

The reaction is generally catalyzed by transition metal complex catalysts, including the so-called "Ziegler-Natta" catalysts, chrome catalysts, and single site catalysts, for example optionally substituted cyclopentadienyl and other π-bonded titanium, zirconium, and hafnium complexes such as bis(methylcyclopentadienyl) zirconium dichloride and bis(cyclopentadienyl) hafnium dimethyl. Cocatalysts or activators such as non-coordinating bulky anions, metal alkyls, or alumoxanes are often useful and generally required. The catalysts are generally supplied supported on inorganic carriers, preferably silaceous carriers such as silica, although homogenous catalysts may also be useful. All these catalysts, as well as other additives such as antistats, antifoulants and the like, are well known to those skilled in the art of olefin polymerization.

Because hydrogen disengagement occurs between slurry reactors in the reactor cascade, it is not necessary to select catalysts with substantial hydrogenation activity. Rather, the catalyst can be selected with regard to desired polymer properties such as molecular weight, molecular weight distribution, degree of short and long term branching, randomness and/or efficiency of comonomer incorporation, etc. The relative freedom with respect to catalyst choice allows for product optimization not possible when only hydrogenating catalysts are required. By the same token, such catalysts may be used, either alone or in conjunction with other catalysts when desired polymer properties dictate their use.

The DV and its associated components may be fabricated of conventional materials, for example carbon steel, Hastelloy® alloys, Inconel®, nickel, stainless steel, and the like. However, stainless steel is preferred. Clad reactors may also be used. The volume of the DV may vary significantly depending upon the output (Kg/hr) of the first slurry reactor; whether a single DV is used or whether two or more are operated in parallel, each fed by the product slurry from the first reactor; and whether a second DV is operated in series with a first or whether an DV outlet stream is subject to further removal methods. For a pilot plant first slurry reactor having a 44 gallon (166 L) capacity and a nominal 2 hour residence time for which hydrogen disengagement is desired, a DV of 30 inch (46 cm) inside diameter and length (to conical bottom) of about 50-60 inches (1.3 m to 1.5 m) (170 gallon, 643 L) is satisfactory when employed as the sole hydrogen removal means in cascaded reactors.

With the foregoing in mind, sizing the various stream flows and makeup, and operating temperatures and pressures can be established by established methods, for example with assistance of industry standard software. Proprietary software based on basic chemical engineering principles may of course be used as well.

The lock hopper volume is generally about 5% or less of the DV volume, although larger lock hoppers may be used if desired. The DV may serve as the supply to a single lock hopper or to a plurality of lock hoppers. The lock hoppers themselves may constitute a simple tube of any desired cross-section with appropriate shot feeders or valves between the DV and the solvent supply and product flush lines, or may constitute a single valve having multiple passageways which alternate between communicating with the DV and with the solvent lines.

Having generally described this invention, a further understanding can be obtained by reference to certain specific examples which are provided herein for purposes of illustration only and are not intended to be limiting unless otherwise specified.

EXAMPLE 1

A pilot plant cascaded reactor configuration is employed to produce polyethylene copolymers. The first reactor is a slurry loop reactor having a volume of 44 gallons (166 L), while the second reactor is an 88 gallon (232 L) slurry loop reactor. The settling leg of the first reactor is directed to a 170 gallon (643 L) disengagement vessel as shown in FIG. 1. The lock hopper of the disengagement vessel is that of FIG. 3. The overall process is therefore similar to that shown in FIG. 2.

Ethylene is copolymerized with 1-butene in the presence of hydrogen to produce a high melt index polymer in the first reactor ("A reactor") employing a titanium Ziegler-Natta catalyst activated with triethylaluminum, and with higher 1-butene concentration and substantially no hydrogen in a second reactor ("B reactor"), to produce a multimodal polymer of low melt index. No additional catalyst is added to the second reactor. The reactant concentrations and product properties are tabulated in Table 1. Although a very small amount of hydrogen is fed to the second reactor to reproducibly control melt index, the actual hydrogen concentration in the second reactor is below the detectable limit, despite the 1.0 mol % hydrogen present in the first reactor. The disengagement vessel is quite effective in disengaging hydrogen between the two reactors.

EXAMPLE 2

Example 1 is repeated with somewhat different monomer amounts in the first reactor, and with both 1-butene and 1-hexene comonomers in the second reactor. Once again, hydrogen is very effectively disengaged by the disengagement vessel between the reactors. The details are presented in Table 1.

EXAMPLE 3

Example 1 is repeated with slightly different monomer and hydrogen content in the first reactor, but with the second reactor employing 1-hexene as the comonomer. The details are presented in Table 1. As can be seen, although 1.7 mol percent butene is employed in the first reactor, the disengagement vessel removes the majority of butene as well as hydrogen, allowing the polymer produced in the second reactor to incorporate only a very minor amount of butene. The hydrogen disengagement vessel is effective to remove both hydrogen and comonomer from the first reactor.

TABLE 1

|  | Example | | |
| --- | --- | --- | --- |
|  | 1 | 2 | 3 |
| A Reactor |  |  |  |
| Reactor Temperature, °F. (°C.) | 180 (82.2) | 180 (82.2) | 180 (82.2) |
| Ethylene Conc. mol % | 4.7 | 4.2 | 4.3 |
| Butene Conc, mol % | 1.7 | 1.7 | 1.7 |
| Hydrogen Conc, mol % | 1.0 | 1.0 | 0.9 |
| Melt Index, g/10 min | 62 | 71 | 70 |
| Density, g/cm$^3$ | 0.954 | 0.955 | 0.954 |
| B Reactor |  |  |  |
| Reactor Temperature, °F. (°C.) | 180 (82.2) | 190 (87.8) | 180 (82.2) |
| Ethylene Conc, mol % | 8.4 | 8.8 | 9.3 |
| Butene Conc, mol % | 20 | 14.6 | 0.1 |
| Hexene Conc, mol % | n/a | 5.95 | 6.1 |
| Hydrogen Feed Rate, pph | 0.00075 | 0.00065 | 0.002 |
| Hydrogen Concentration, mol % | Below DL[1] | Below DL[1] | Below DL[1] |
| Melt Index, g/10 min | 0.06 | 0.10 | 0.07 |
| Density, g/cm$^3$ 19 | 0.931 | 0.927 | 0.944 |

[1]DL—detectable limit

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for disengagement of non-polymer-associated components from a first slurry polymerization reactor product slurry stream containing solid polymer particles in a slurry solvent, said method comprising:

introducing a non-polymer-associated component-containing polymer slurry from a first slurry reactor into a disengagement vessel, said disengagement vessel terminating at a lower end thereof with a lock hopper having a cavity therein which is selectively communicatable between an interior of said disengagement vessel and a supply of slurry solvent;

filling said cavity with slurry solvent when said cavity is not in fluid communication with said disengagement vessel;

causing said cavity to be in fluid communication with said interior of said disengagement vessel, and allowing polymer particles contained in a polymer particle slurry in said disengagement vessel to enter said cavity, displacing slurry solvent into said disengagement vessel from said cavity;

ceasing communication of said cavity with said interior of said disengagement vessel, establishing fluid communication of said cavity with said supply of slurry solvent, and flushing polymer particles from said cavity with slurry solvent as a solvent flush polymer slurry, at least one non-polymer-associated component concentration in said solvent flush polymer slurry being less than the concentration of said at least one non-polymer-associated component in said disengagement vessel.

2. The process of claim 1, wherein the interior of the disengagement vessel is maintained at a pressure and at a temperature such that said slurry solvent is at its bubble point.

3. The process of claim 1, wherein a liquid phase in said disengagement vessel is maintained at a pressure lower than the pressure of said first slurry reactor and at a temperature higher than the temperature of said first slurry reactor.

4. The process of claim 1, wherein said non-polymer-associated component-containing polymer slurry is collected in a settling leg of said first slurry reactor at a higher polymer solids content than the polymer content of the polymer slurry circulating in the first slurry polymerization reactor, and is diluted with additional solvent prior to entering said disengagement vessel.

5. The process of claim 1, wherein a sparge of nitrogen gas is introduced proximate the bottom of said disengagement vessel above said lock hopper.

6. The process of claim 1, wherein said non-polymer-associated component comprises hydrogen.

7. The process of claim 1, wherein said non-polymer-associated component comprises an unsaturated monomer.

8. The process of claim 7, wherein said unsaturated monomer comprises an olefin monomer.

9. The process of claim 1, wherein said non-polymer-associated component comprises hydrogen and an olefin monomer.

10. A process for the slurry polymerization of an olefin monomer and optionally of unsaturated comonomers to form a polyolefin polymer having a multimodal molecular weight distribution, employing the disengagement method of claim 1, said process comprising:

a) introducing olefin monomers, slurry solvent, and optionally unsaturated comonomers, hydrogen, and at least one olefin polymerization catalyst into a first slurry polymerization reactor, and polymerizing to form a first polymer particle slurry;

b) withdrawing a first polymer particle slurry containing at least one non-polymer-associated component from said first slurry polymerization reactor and introducing said first polymer particle slurry into a disengagement vessel having a lock hopper proximate the bottom thereof, said lock hopper having a cavity selectively communicable with an interior of said disengagement vessel and a slurry solvent supply;

c) filling said lock hopper cavity with slurry solvent to form a slurry solvent-containing lock hopper cavity;

d) establishing communication of said slurry solvent-containing lock hopper cavity with said interior of said disengagement vessel, whereby polymer particles enter said cavity, displacing slurry solvent therefrom into the interior of said disengagement vessel, to form a slurry solvent-washed polymer slurry in said cavity;

e) terminating communication of said cavity with said interior of said disengagement vessel, flushing said slurry solvent-washed polymer slurry from said cavity with slurry solvent as a solvent flush polymer slurry, and refilling said cavity with slurry solvent;

f) introducing said solvent flush polymer slurry into a subsequent slurry polymerization reactor;

g) introducing a polymerization mixture comprising further olefin monomer, optionally unsaturated comonomer(s), optionally hydrogen, and optionally further olefin polymerization catalyst into said subsequent slurry polymerization reactor, the concentration of at least one non-polymer-associated component in said subsequent polymerization reactor being less than the concentration of at least one non-polymer-associated component in said first slurry polymerization reactor; and h) recovering from said subsequent slurry polymerization reactor a polyolefin polymer having a multimodal molecular weight distribution, a multicompositional monomer distribution, or both a multicompositional molecular weight distribution and a multimodal monomer distribution.

11. The process of claim 10, wherein three slurry polymerization reactors are employed, an intermediate slurry reactor preceding said subsequent slurry polymerization reactor, and at least one disengagement vessel to lower concentration of at least one non-polymer-associated component, said at least one disengagement vessel located between any two of said three slurry reactors.

12. The process of claim 10, wherein said monomer is ethylene, and said further monomer is ethylene.

13. The process of claim 10, wherein said slurry solvent is a light solvent having a boiling point at standard pressure of less than 0° C.

14. The process of claim 10, wherein olefin polymerization catalyst is added only to said first polymerization reactor.

15. The process of claim 10, wherein said first slurry reactor is maintained at a first slurry reactor pressure and a first slurry reactor temperature; a disengagement vessel is located between said first slurry reactor and said subsequent slurry reactor; and wherein said disengagement vessel is maintained at a pressure lower than said first slurry reactor pressure and at a temperature higher than said first slurry reactor temperature.

16. The process of claim 15, wherein said disengagement vessel is maintained at the bubble point of said slurry solvent.

17. The process of claim 10, wherein said non-polymer-associated component comprises hydrogen.

18. The process of claim 10, wherein said non-polymer-associated component comprises at least one of hydrogen, an unsaturated monomer, a soluble activator, or a soluble scavenger.

* * * * *